(No Model.)

W. A. WILSON.
CORN HEADER.

No. 603,934.  Patented May 10, 1898.

WITNESSES:

INVENTOR
W. A. Wilson.
BY
ATTORNEYS.

THE NORRIS PETERS CO., PHOTO-LITHO., WASHINGTON, D. C.

UNITED STATES PATENT OFFICE.

WILLIAM A. WILSON, OF CENTROPOLIS, KANSAS.

CORN-HEADER.

SPECIFICATION forming part of Letters Patent No. 603,934, dated May 10, 1898.

Application filed May 8, 1897. Serial No. 635,673. (No model.)

*To all whom it may concern:*

Be it known that I, WILLIAM A. WILSON, of Centropolis, in the county of Franklin and State of Kansas, have invented a new and Improved Corn-Header, of which the following is a full, clear, and exact description.

This invention is an apparatus adapted to pass through a field of corn and cut off the tops of the corn, so as to leave the lower portions of the stalks and the ears thereof intact, thus permitting the employment of the tops of the corn as stock-food and the curing of the ears of corn by the natural process.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1:
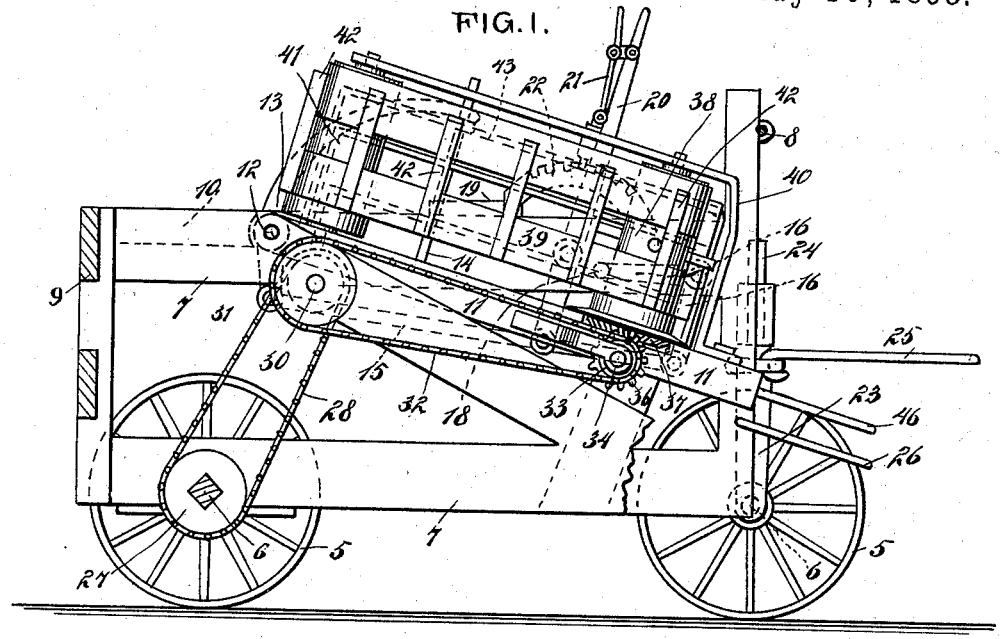
Figure 2:
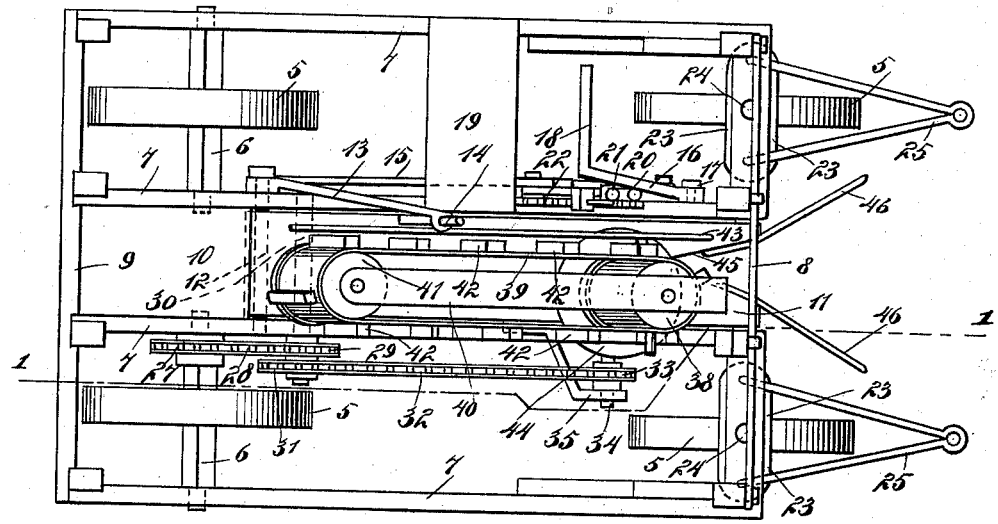
Figure 3:
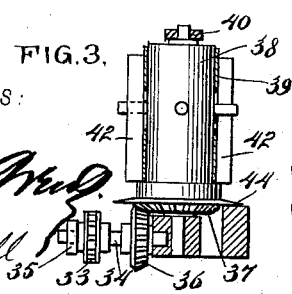
Figure 4:
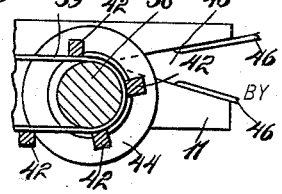

Figure 1 is a section of the invention on the line 1 1 of Fig. 2. Fig. 2 is a plan view of the invention. Fig. 3 is a detail section showing one of the drums for the apron, and Fig. 4 is a detail section illustrating the cutter and its mode of action.

The apparatus is mounted on four wheels 5, each fixed on an axle 6, carried in the frame of the apparatus. The frame of the apparatus consists in two side sections 7, joined to each other at the front by a transverse bar 8 and at the rear by a transverse beam 9. The bar 8 and the beam 9 are raised above the level of the ground, so as to permit the stalks to pass between the two sections 7 of the frame without being knocked down by the frame. The side sections 7 run parallel with each other and have a space midway between them, which forms a passage-way for the corn. The axles 6 of the front wheels 5 are respectively carried in brackets 23, that have spindles 24, projecting upward therefrom and respectively revolubly mounted in the sections 7 of the frame. Attached to each bracket 23 is a tongue 25, to which the team may be hitched. The inner rail of each side section of the frame is provided with a series of guides 26, that diverge from each other on each side section and serve to direct the stalks of corn truly between the two side sections of the apparatus.

Secured between the side sections 7 of the frame and at the rear thereof is a rigid horizontal platform 10, at the front edge of which is a swinging platform 11, mounted on a shaft 12, extending horizontally between the inner rails of the sections 7 of the frame. The platform 11 normally slants forward and downward, as indicated in Fig. 1. Fixed to the shaft 12 is a lever 13, located at the left-hand end of the shaft and curving upward and forward. The upper end of the lever 13 has an eye loosely receiving a standard 14, that stands rigidly on the swinging platform 11. The lower end of the lever 13 is pivoted to a link 15, that extends forward and is pivoted to the downwardly-extending arm of a bell-crank lever 16, fulcrumed on a stub-shaft 17, carried by the left-hand side section of the frame. The upper arm of the bell-crank lever 16 has a transverse extension 18, extending forward of and slightly below the seat 19, carried on the left-hand side section 7 of the frame. An operator resting on the seat 19 may press downward the transverse extension 18 of the bell-crank lever and move the link 15 forward, thus throwing rearward the lever 13 and raising the swinging platform 11. These connections therefore provide means for controlling the platform 11, the normal position of the platform 11 being that shown in the drawings. Fulcrumed on the inner rail of the left-hand side section 7 of the frame is a lever 20, the lower end of which is pivoted to the link 15 and the upper portion of which carries a pawl-and-lever device 21, coacting with a ratchet-sector 22. This construction provides means for moving the platform 11 by hand-power, contradistinguished from the foot-power of the extension 18.

Fixed on the right-hand axle of the rear wheels 5 is a sprocket-wheel 27, and around this sprocket-wheel 27 runs a sprocket-chain 28, said chain also passing over a sprocket-wheel 29, fixed on a shaft 30, revolubly mounted in the side portions 7 of the frame. The shaft 30 also carries a sprocket-wheel 31, over which a chain 32 passes, and runs forward and over a sprocket-wheel 33, carried on a shaft 34, journaled in the forward portion of the platform 11 and in a bracket 35, extending laterally and forwardly from the right-hand edge of the platform 11. Fixed on the shaft 34 is a bevel-gear 36, that engages a bevel-gear 37 on a drum 38, projecting perpendicularly from the upper side of the platform 11 and mounted thereon. Fixed to the forward portion of the platform 11 is a brace-plate 40, extending upwardly and thence rearwardly parallel with the platform 11, and the upper portion of the drum 38 is mounted in the plate 40. The rear end of the plate 40 carries the upper trunnion of a drum 41, the lower trunnion of which is revolubly mounted in the rear portion of the platform 11. Wound over the drums 38 and 41 is an endless apron 39, carrying cleats 42, adapted to engage the stalks of corn and advance the same rearward. Rigidly supported on the platform 11 and adjacent to the left-hand edge thereof is a railing 43, that coacts with the left-hand run of the apron 39 and serves to hold the tops of the corn firmly as the tops are advanced rearward upon the platform 10. The lower end of the drum 38 carries a circular knife 44, that runs horizontally on the top face of the platform 11. The platform 11 is provided at its front portion with a rearwardly-tapering recess 45, that receives the stalks of corn and serves to bring them together and into position to be effectively engaged by the knife 44. Carried by the front portion of the platform 11 and respectively secured to the walls of the recess 45 are two guide-arms 46, similar to the guide-arms 26 and located above the same. These guide-arms 46 coact with the guide-arms 26 and serve to gather in the stalks of corn, so that they may be effectively presented to the knife 44.

In the use of the apparatus it is drawn through the field of corn, so as to straddle a row of the corn. The arms 26 and 46 throw the stalks inward to the recess 45, whereupon the knife 44 severs the tops of the corn. The tops of the corn are carried rearward between the apron 39 and the railing 43 and delivered upon the platform 10, from whence they may be taken as desired. The bodies of the stalks pass untouched beneath the platforms 10 and 11 and are left intact with the ears of corn thereon. It is now possible to use the tops of the corn when in a green state for the purpose of stock-food, while the ears of corn are permitted to cure by the natural process of development.

Various changes in the form, proportion, and minor details of my invention may be resorted to without departing from the spirit and scope thereof. Hence I do not consider myself limited to the precise construction herein shown, but am entitled to all the variations coming within the scope of my claims.

Having thus described my invention, I claim as new and desire to secure by Letters Patent—

1. The combination of a frame, a platform mounted to swing thereon, a lever fulcrumed on the axis of said platform and having its upper portion extended forwardly beyond said axis, a standard fixed to the platform and having sliding connection with the upper end of the lever, a link pivoted to the lower end of the lever and extending forwardly, a hand-lever mounted on the frame and connected with the link, and a bell-crank lever also mounted on the frame and connected with the link, the bell-crank lever being within reach of the driver's foot.

2. The combination with a frame, of a platform mounted to swing thereon, a standard fixed to the platform, a lever fulcrumed on the axis of the platform and having sliding connection with the standard at the upper end of the lever, a link pivoted to the lower end of the lever and extending forwardly, and means in connection with the forward end of the link, whereby to reciprocate the same.

WILLIAM A. WILSON.

Witnesses:
 H. B. BRAMBACHER,
 SAMUEL CRAMER, Jr.